(12) United States Patent
Stephens et al.

(10) Patent No.: US 10,580,239 B2
(45) Date of Patent: Mar. 3, 2020

(54) WIRELESS POWERED DIGITAL LOCK

(71) Applicant: Integrated Device Technology, Inc., San Jose, CA (US)

(72) Inventors: Christopher Stephens, San Jose, CA (US); Jianbin Hao, San Jose, CA (US); Pietro Polidori, Montignoso (IT); Giulio Spinelli, Monza (IT)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

(21) Appl. No.: 16/544,549

(22) Filed: Aug. 19, 2019

(65) Prior Publication Data

US 2019/0371103 A1 Dec. 5, 2019

Related U.S. Application Data

(62) Division of application No. 15/633,231, filed on Jun. 26, 2017.

(Continued)

(51) Int. Cl.

| G07C 9/00 | (2006.01) |
|---|---|
| E05B 47/00 | (2006.01) |
| H04B 5/00 | (2006.01) |

(52) U.S. Cl.
CPC ...... *G07C 9/00571* (2013.01); *E05B 47/0001* (2013.01); *G07C 9/00309* (2013.01);
(Continued)

(58) Field of Classification Search
CPC ............ G07C 9/00571; G07C 9/00309; G07C 2009/00634; G07C 2009/00769; G07C 2209/64; E05B 47/0001; H04B 5/0037
(Continued)

(56) References Cited

U.S. PATENT DOCUMENTS 6,161,005 A 12/2000 Pinzon
6,275,143 B1 8/2001 Stobbe
(Continued)

FOREIGN PATENT DOCUMENTS

WO 2016068916 A1 5/2016

OTHER PUBLICATIONS

International Search Report for PCT Application No. PCT/US2017/039451 Issued by the U.S. International Searching Authority dated Sep. 7, 2017; pp. 1-2.
(Continued)

*Primary Examiner* — Nay Tun
(74) *Attorney, Agent, or Firm* — Haynes and Boone, LLP

(57) ABSTRACT

An electronic lock that interacts with a mobile device is presented. In accordance with some embodiments, an electronic lock includes a wireless power receiver configured to receiver power from a mobile device; a processor coupled to receive power from the wireless power receiver; a memory coupled to the processor and to receive power from the wireless power receiver; a communication unit coupled to the processor and to receive power from the wireless power receiver, the communication unit configured to communicate with the mobile device; and an actuator coupled to the processor and to receive power from the wireless power receiver. The processor executes instructions stored in a memory for authenticating the mobile device, and providing signals to the actuator according to instructions received from the mobile device once it is authenticated. The mobile device provides power to the electronic lock and instructs it to lock or unlock a locking mechanism.

4 Claims, 3 Drawing Sheets

Related U.S. Application Data

(60) Provisional application No. 62/357,289, filed on Jun. 30, 2016.

(52) U.S. Cl.
CPC . *H04B 5/0037* (2013.01); *G07C 2009/00634* (2013.01); *G07C 2009/00769* (2013.01); *G07C 2209/64* (2013.01)

(58) Field of Classification Search
USPC ........................................................ 340/5.61
See application file for complete search history.

(56) References Cited

U.S. PATENT DOCUMENTS

| | | |
|---|---|---|
| 2002/0018014 A1 | 2/2002 | Allen, Jr. |
| 2002/0024420 A1 | 2/2002 | Ayala et al. |
| 2002/0183008 A1 | 12/2002 | Menard et al. |
| 2003/0102957 A1 | 6/2003 | Crisp |
| 2015/0107316 A1 | 4/2015 | Kirkjan |
| 2015/0332527 A1 | 11/2015 | Pukari |
| 2016/0080372 A1 | 3/2016 | Martin et al. |
| 2017/0244555 A1* | 8/2017 | Beiter .................. H04L 9/3213 |

OTHER PUBLICATIONS

Written Opinion for PCT Application No. PCT/US2017/039451 Issued by the U.S. International Searching Authority dated Sep. 7, 2017; pp. 1-8.

European Communication with Supplementary European Search Report from European Patent Application No. 17821064.7, dated Dec. 17, 2019, pp. 1-7.

\* cited by examiner

WIRELESS POWERED DIGITAL LOCK

RELATED APPLICATIONS

The present application is a divisional of U.S. patent application Ser. No. 15/633,231, filed Jun. 26, 2017, which claims priority to U.S. Provisional Application 62/357,289, filed on Jun. 30, 2016, entitled "Wireless Powered Digital Lock" which is herein incorporated by reference in its entirety.

TECHNICAL FIELD

Embodiments of the present invention are related to wireless power receivers and, specifically, to wireless powered digital locks.

DISCUSSION OF RELATED ART

Mobile devices, for example smart phones and tablets, are increasingly using wireless power charging systems. However, there are multiple different standards for wireless transfer of power, which utilize a variety of different transmission frequencies. Frequencies used can vary widely, for example from less than 200 KHz to over 6.78 MHz.

The more common standards for wireless transmission of power include the Alliance for Wireless Power (A4WP) standard and the Wireless Power Consortium standard, the Qi Standard. Under the A4WP standard, for example, up to 50 watts of power can be inductively transmitted to multiple charging devices in the vicinity of a coil at a power transmission frequency of around 6.78 MHz. Under the Wireless Power Consortium, the Qi specification, an inductive coupling system is utilized to charge a single device at the resonance frequency of the device. In the Qi standard, the receiving device coil is placed in close proximity with the transmission coil while in the A4WP standard, the receiving device coil is placed near the transmitting coil, potentially along with other receiving coils that belong to other charging devices.

Devices that can utilize wireless power transmission incur the cost and the space limitations of power coils and circuitry associated with the wireless power. Therefore, there is a need to develop uses for the wireless power equipment.

SUMMARY

In accordance with aspects of the presents, an electronic lock that interacts with a mobile device is presented. In accordance with some embodiments, an electronic lock includes a wireless power receiver configured to receiver power from a mobile device; a processor coupled to receive power from the wireless power receiver; a memory coupled to the processor and to receive power from the wireless power receiver; a communication unit coupled to the processor and to receive power from the wireless power receiver, the communication unit configured to communicate with the mobile device; and an actuator coupled to the processor and to receive power from the wireless power receiver. The processor executes instructions stored in a memory for authenticating the mobile device, and providing signals to the actuator according to instructions received from the mobile device once it is authenticated.

In some embodiments, authenticating the mobile device includes generating a pseudo random number; transmitting the pseudo random number to the mobile device; receiving a device session key from the mobile device; and confirming that the device session key is valid.

A mobile device according to some embodiments includes a wireless power receiver/transmitter; a power storage coupled to the wireless power receiver/transmitter; a processor coupled to the wireless power receiver/transmitter; a communications coupled to the processor; and a memory coupled to the processor, wherein the processor executes instructions stored in the memory for providing power to the electronic lock, receiving a pseudo-random number from the electronic lock, convoluting the pseudo-random number with a pairing key to generate a device session key, transmitting the device session key to the electronic lock, and providing instructions to the electronic lock to open or close a locking mechanism once the electronic lock validated the mobile device.

These and other embodiments are further discussed below with respect to the following figures.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description and the accompanying drawings that illustrate inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

Elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

Figure 1:
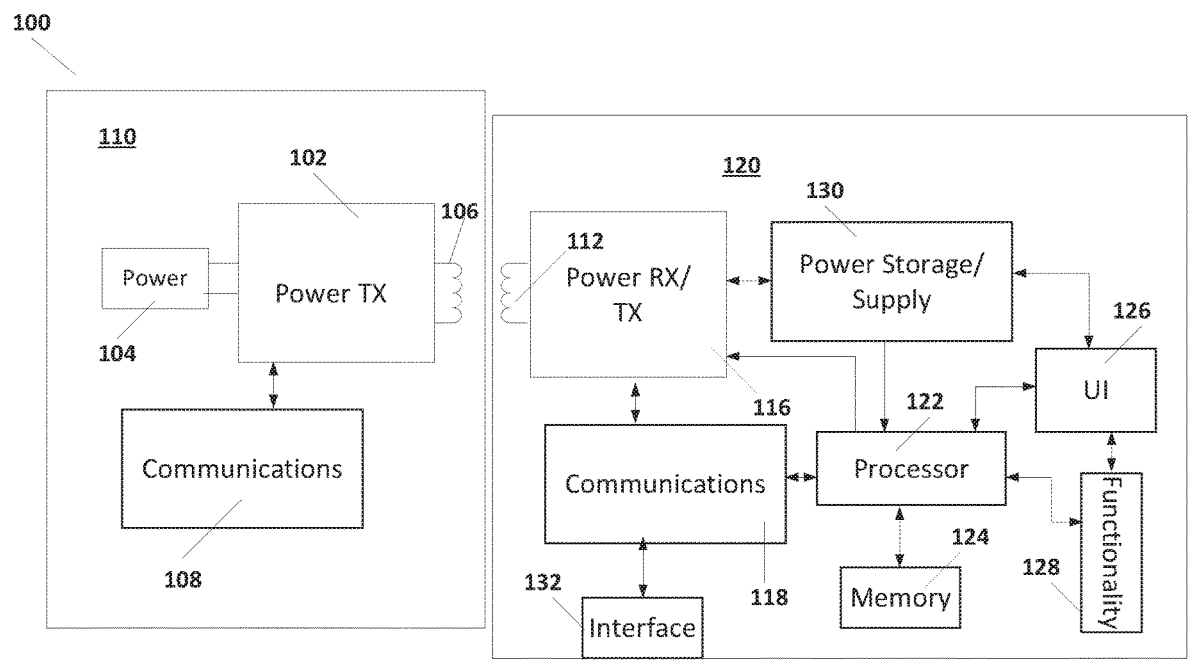
FIG. 1 illustrates a wireless power transmission system according to some embodiments of the present invention.

FIG. 1 illustrates a system 100 for wireless transfer of power. As illustrated in FIG. 1, a wireless power transmitter 110 receives power from a power supply 104 into power transmitter 102 to drive a coil 106, producing a magnetic field. Power supply 104 can be, for example, a battery based supply or may be powered by alternating current for example 120V at 60 Hz. Wireless power transmitter 102 drives coil 106 at, typically, a range of frequencies, typically according to one of the wireless power standards.

FIG. 1 further shows a mobile device 120 that can be charged with wireless power transmitter 110. The magnetic field produced by coil 106 induces a current in coil 112, which results in power being received in a receiver 116. Receiver 116 receives the power from coil 112 and provides power to the remainder of mobile device 120. As shown in FIG. 1, power receiver 112 may be coupled to charge storage device 130, which in turn powers the remainder of mobile device 120.

As is further illustrated in FIG. 1, mobile device 120 may include a processor 122, a user interface 126, specific functional circuitry 128 (e.g. cell phone receivers or other functionality used by mobile device 120), and memory 124. Memory 124 can include both volatile and non-volatile memory in order store programming instructions executed by processor 122 and data.

Mobile device 120 also includes communications 118 coupled with processor 122. In some embodiments, communications 118. In some embodiments, communications 118 is coupled to interface 132, which provides communications with other devices. In some embodiments, interface 132 transmit and receive data using wireless transmission protocols, for example Bluetooth, Zigbee, WiFi or other radio links. In some embodiments, communications 118 may further be coupled to power receiver 116 in order to transmit data through the wireless power coupling by modulating the load. In some embodiments, communications 118 may modulate the load of power receiver 116 with the same frequency as the transmitted power (in-band communications) or at a different frequency (out-of-band communications). In embodiments where communications 118 is coupled to power receiver 116, transmission of data can be achieved by modulating the load and receipt of data can be achieved through monitoring a frequency modulation of the wireless power received, for example.

In some embodiments, as shown in FIG. 1, wireless power transmitter includes communications 108, which allows wireless transmitter 110 to receive communications from a receiver through load modulation. Further, transmitter 110 may transmit data by, for example, frequency modulating the wireless power transmitted between coil 106 and coil 112.

As shown in FIG. 1, then, mobile device 120 can transmit and receive data through the wireless interface 132 and/or, in some embodiments, power receiver 116. However, mobile device 120 can also utilize power receiver 116 as a power transmitter, thereby wirelessly transferring power from power storage 130 to another device.

Figure 2:
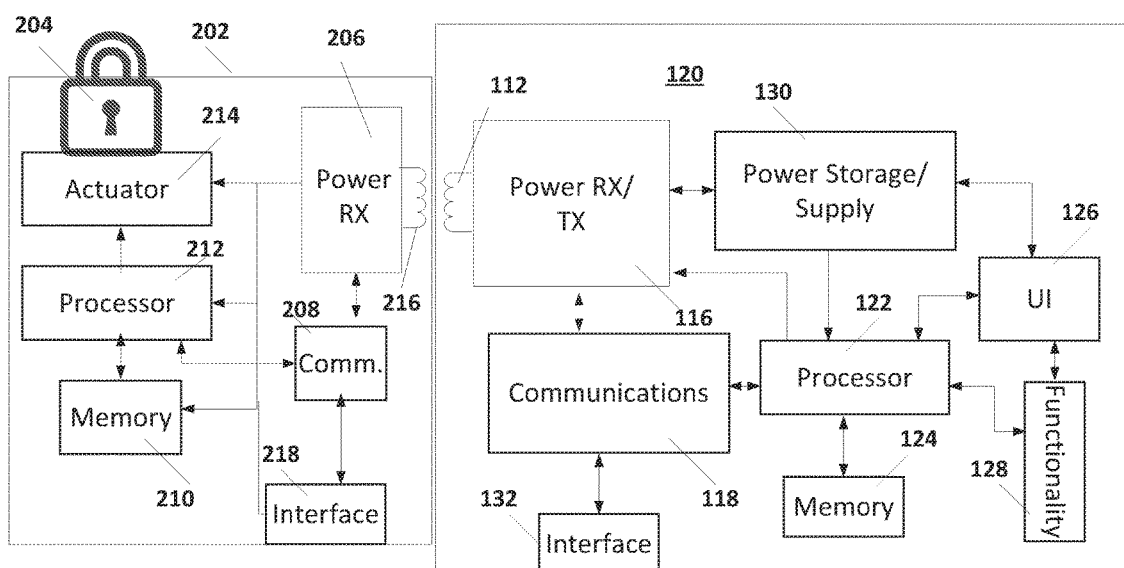
FIG. 2 illustrates a mobile device utilizing the wireless power transmission to communicate with a digital electronic lock according to some embodiments of the present invention.

FIG. 2 illustrates use of mobile device 120 with an electronic lock 202. As illustrated in FIG. 2, electronic lock 202 includes a power receiver 206 that wirelessly receives power from a coil 216. Power receiver 206 provides power to processor 212, memory 210, actuator 214, communications 208, and interface 218. As is illustrated, electronic lock 202 may have no internal power source and is powered completely from wireless power through power receiver 206. As is further illustrated in FIG. 2, power receiver 116 of mobile device 120 may function as a wireless power transmitter to transfer power stored in power storage 130 to electronic lock 202 when mobile device 120 is placed in proximity to electronic lock 202.

Processor 212 is coupled to memory 210, which includes both volatile and non-volatile memory to store programming instructions and data. Processor 212 is also coupled to actuator 214. Actuator 214 receives an actuation signal from processor 212 and, in response, activates an electromechanical interface (for example an armature) to engage or disengage the locking mechanism 204 of lock 202.

Processor 212 is further coupled to communications 208. Communications 208 is coupled to an interface 218 and/or to power receiver 206. In some embodiments, communications 208 can transmit and receive data through wireless power receiver 206 by monitoring the wireless power for frequency modulation and by applying load modulation. In some embodiments, communications 208 can transmit and receive data through interface 218, which may represent any wireless transmission such as, for example, Bluetooth, Zigbee, WiFi or other radio links.

Consequently, mobile device 120 provides power to operate electronic lock 202. Once in operation, electronic lock 202 can authenticate mobile device 120 and can lock or unlock lock 204. Electronic lock 202 is powered during the process by mobile device 120 through a wireless power transfer and therefore electronic lock 202 may not include an independent power source such as a separate battery. This prevents the problem that, when using a separate battery to power an electronic lock that fails or is discharged, there is no way to authenticate a user or to lock/unlock lock 204 electronically.

As is illustrated in FIG. 2, mobile device 120 can execute an application that operates power receiver 116 as a transmitter of wireless power and interfaces with electronic lock 202. Instructions for the application can be stored in memory 124 and be executed by processor 122. Executing these instructions, processor 122 can operate power receiver 116 as a transmitter of wireless power and communicate with electronic lock 202 through communications 118. Similarly, memory 210 may include instructions to be executed by processor 212 so that when electronic lock 202 is powered by receiving wireless power in power receiver 206, processor 212 can communicate with mobile device 120 through communication 208 and unlock and/or lock lock 204 through actuator 214.

Figure 3A:
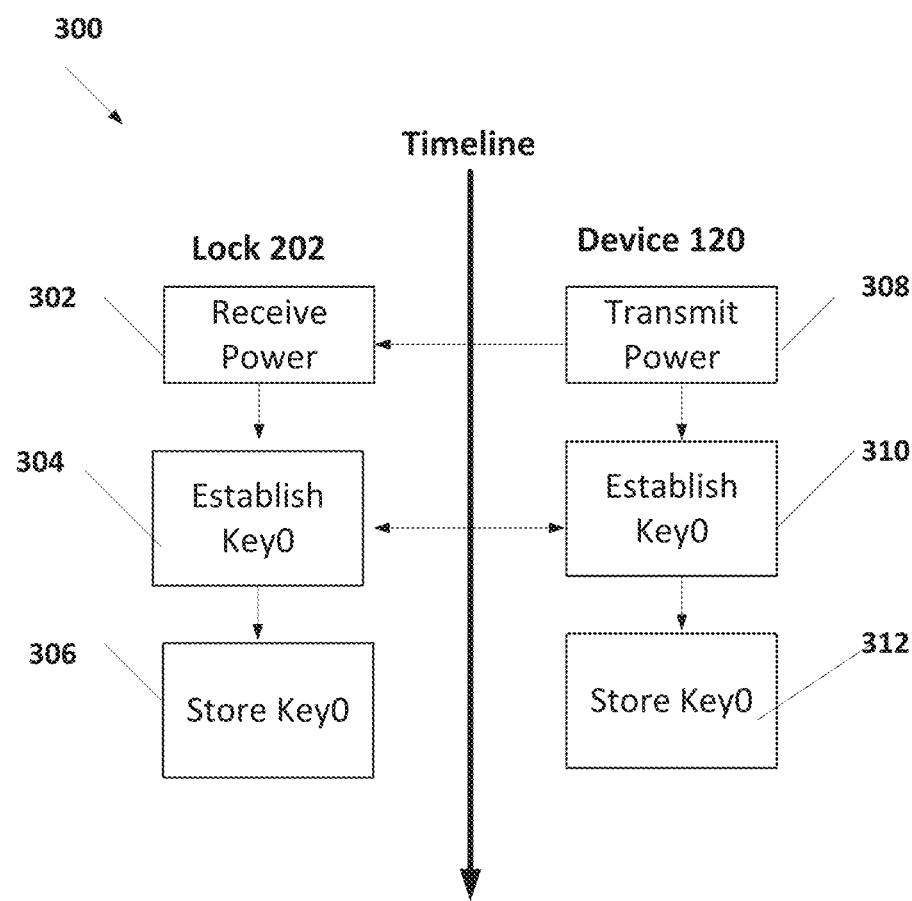
FIG. 3A illustrates an initial configuration communications between a mobile device and an electronic lock according to some embodiments.

FIG. 3A illustrates an initiation process 300 executed by mobile device 120 and electronic lock 202 to initialize lock 202 with mobile device 120. As shown in FIG. 3A, device 120 initiates by transmitting power in step 308. The power is received in step 302. In steps 304 and 310, a key Key0 is negotiated between device 120 and lock 202. In some embodiments, the initial pairing between device 120 and lock 202 can be accomplished by procedures similarly to that used in Bluetooth pairing of devices. In other communications standards, the negotiation between device 120 and lock 202 establishes that device 120 is an authorized user of lock 202 and assigns the key Key0 to device 120. In step 306, lock 202 stores Key0 in a non-volatile portion of memory 210. In step 312, device 120 stores Key0 in a non-volatile portion of memory 124. Storage of Key0 in non-volatile memory insures that Key0 is not lost when electronic lock 202 is without power or if power storage 130 of device 120 becomes discharged. Key0 is the initial pairing key that is established privately when lock 202 is first paired with device 120. Device 120 may store multiple ones of initial pairing keys that correspond with different ones of locks 202. Similarly, lock 202 may include multiple ones of initial pair keys that correspond with different ones of devices 202.

Figure 3B:
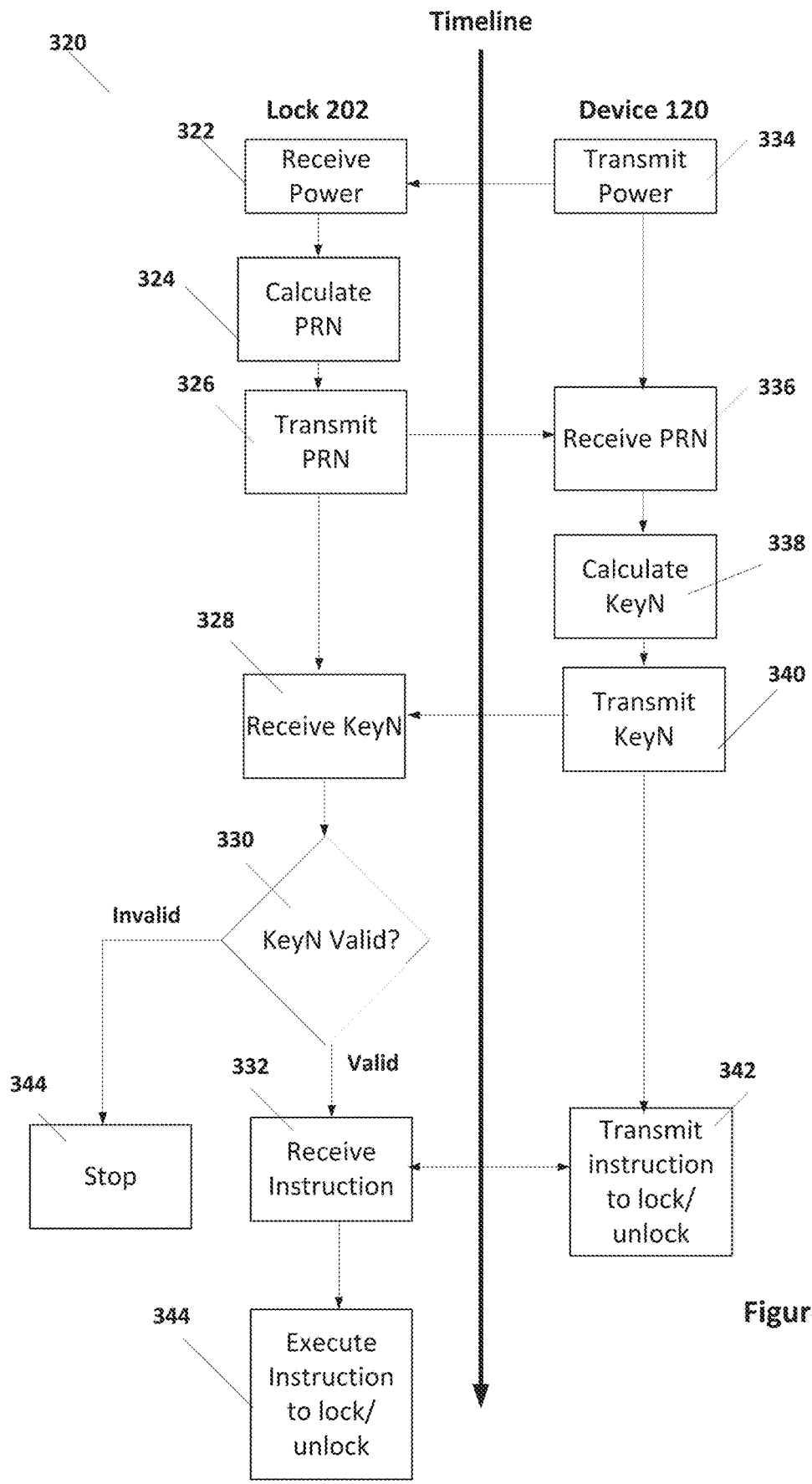
FIG. 3B illustrates a locking/unlocking session between the mobile device and the electronic lock according to some embodiments.

An example of subsequent interactions between device 120 and lock 202 are illustrated in FIG. 3B. Again, the interaction begins in step 334 when device 120 transmits power to lock 202 and power is received in step 322. When powered, lock 202 in step 324 lock 202 can generate a pseudorandom number (PSN), which when convoluted with Key0 provides a session key KeyN. In step 326, lock 202 transmits the PSN to step 336 in device 120. In some embodiments, PSN is encrypted during transmission. In step 338, device 120 calculates the session key KeyN by convoluting the pairing key Key0 with the PSN. KeyN is the session key that device 120 must correctly provide to lock 102 in order to operate lock 102 (either open lock 102 or lock lock 102). KeyN is the convolution of the decrypted PSN generated in step 324 and the previously established pairing key Key0 and therefore changes every session to thwart unauthorized use by EM filed interception.

In step 340, device 120 transmits the session key KeyN to step 328 of lock 202. In step 330 of lock 320, lock 202 validates KeyN. If KeyN is not valid, then lock 202 proceeds to step 344 and stops. If KeyN is valid, then lock 202 proceeds to step 332 to receive instructions. In step 342, device 120 transmits instructions to lock 202 to lock or unlock lock 202. In step 344, lock 202 executes the instructions by providing signals to actuator 214 to lock or unlock locking mechanism 204.

The above detailed description is provided to illustrate specific embodiments of the present invention and is not intended to be limiting. Numerous variations and modifications within the scope of the present invention are possible. The present invention is set forth in the following claims.

What is claimed is:

1. A mobile device configured to interact with an electronic lock, the mobile device comprising:
   a wireless power receiver/transmitter;
   a power storage coupled to the wireless power receiver/transmitter;
   a processor coupled to the wireless power receiver/transmitter;
   a communications coupled to the processor; and
   a memory coupled to the processor,
   wherein the processor executes instructions stored in the memory for
      providing power to the electronic lock,
      receiving a pseudo-random number from the electronic lock,
      convoluting the pseudo-random number with a pairing key to generate a device session key,
      transmitting the device session key to the electronic lock, and
      providing instructions to the electronic lock to open or close a locking mechanism once the electronic lock validated the mobile device.

2. The mobile device of claim 1, wherein the instructions stored in memory further include instructions for pairing the mobile device with the electronic lock to generate the pairing key.

3. A method of operating a mobile device to interact with an electronic lock, comprising:
   providing power to the electronic lock,
   receiving a pseudo-random number from the electronic lock,
   convoluting the pseudo-random number with a pairing key to generate a device session key,
   transmitting the device session key to the electronic lock, and
   providing instructions to the electronic lock to open or close a locking mechanism once the electronic lock validated the mobile device.

4. The mobile device of claim 1, wherein the instructions stored in memory further include instructions for pairing the mobile device with the electronic lock to generate the pairing key.

* * * * *